July 5, 1927.
G. F. A. OCHS
1,634,626
TIRE FILLER
Filed Aug. 14, 1926
2 Sheets-Sheet 1
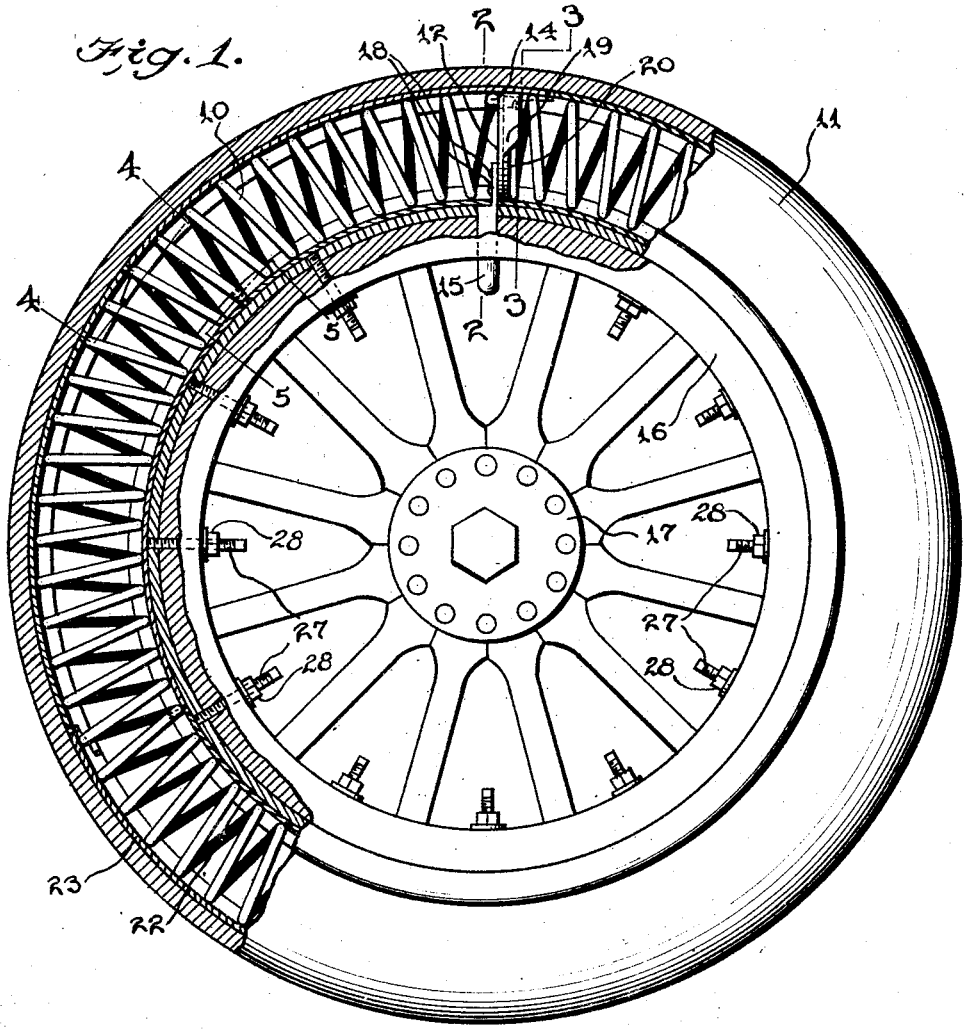
Inventor
George F. A. Ochs July 5, 1927.
G. F. A. OCHS
TIRE FILLER
Filed Aug. 14. 1926
1,634,626
2 Sheets-Sheet 2
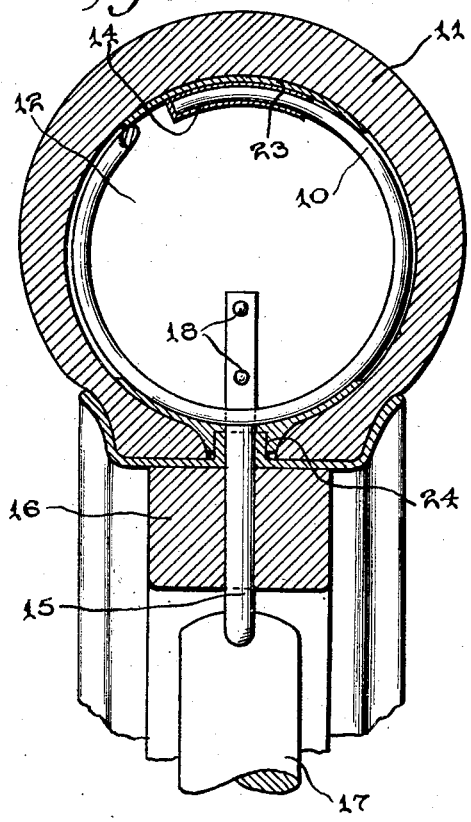
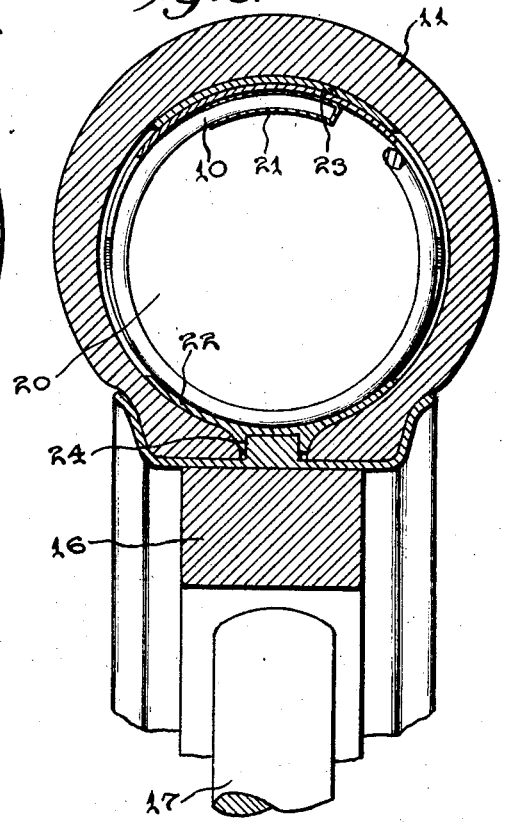
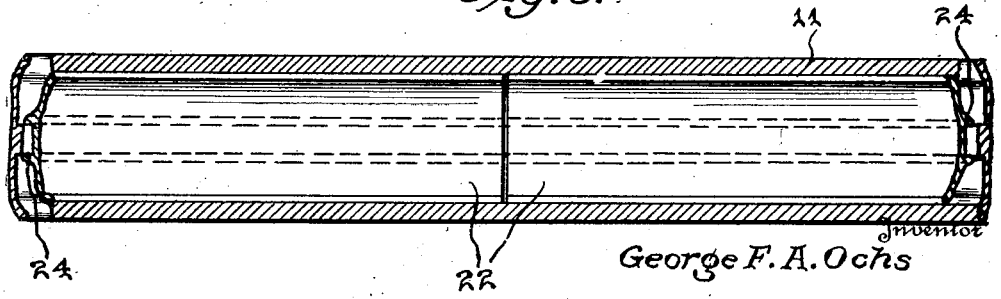
Inventor
George F. A. Ochs
By
Attorney Patented July 5, 1927.

UNITED STATES PATENT OFFICE.

GEORGE F. A. OCHS, OF NEWARK, NEW JERSEY.

TIRE FILLER.

Application filed August 14, 1926. Serial No. 129,191.

The object of the invention is to provide a mechanical device adapted for placement in the shoe of a pneumatic tire to replace the conventional air-filled inner tube; to provide a filler in the form of a spiral spring and adjustable means for radially expanding it when placed in the shoe; to provide such a filler with an anchoring means to prevent creeping when mounted; to provide a simple and yet efficient means for connecting or engaging the ends of the filler; and to provide circumferentially expansible shrouds for both the inner and outer peripheries of the filler where it engages the rim or felly and the tread portion of the shoe respectively.

With this object in view the invention consists in a construction and combination of parts of which a preferred embodiment is illustrated in the accompanying drawings, in which:

Figure 1 is a side view of a vehicle wheel and its attached tire, partly in elevation and partly in section, showing the invention applied in operative position.

Figures 2, 3, 4 and 5 are respectively sectional views on the planes indicated by the lines 2—2, 3—3, 4—4 and 5—5 of Figure 1.

The filler 10 consists of a spiral spring of which the convolutions are separated and have a diameter approximating the interior diameter of the shoe 11. The normal length of the spring is slightly in excess of the circumferential length of the shoe at the center of the latter, so that when mounted it is placed under slight compression. One terminal of the filler engages an anchor plate 12 of circular form and dimensioned according to the cross-sectional dimension of the filler, being provided at one point on its peripheral edge with a sleeve 14 constituting a socket for the engagement of one extremity of the filler. The anchor plate is provided with a stem 15 extending radially through a hole or opening in the felly 16 of the vehicle wheel 17, the stem being secured to the anchor plate as by rivets 18. On the opposite face the anchor plate is provided with a semi-circular flange 19 of approximately 180 degrees in extent, this flange bounding the anchor plate on the outer peripheral edge of the latter and constituting together with the adjacent face of the anchor plate a seat for the plate 20 with which the other extremity of the filler is engaged, this plate 20 being provided with a sleeve 21 similar to the sleeve 14 constituting a socket for said other extremity of the spring. By means of this construction, the anchor plate constitutes a means precluding undue pressure against the shoe at the point of connection between the two extremities of the filler, which would be the case were these extremities unrestrained, the normal tendency of the filler at the extremity being for them to move radially outward.

Inner and outer shroud plates 22 and 23 are provided, the inner shroud plate consisting of a plurality of sections of which each is channeled on the under face as indicated at 24 to provide a seat in which the felly 16 may engage. The outer shroud plate also consists of a plurality of sections of which connecting sections are interlocked at their extremities as by means of a tongue 25 on the one engaging a slot 26 on the other.

In order to effect firm engagement of the outer shroud plate with the inner periphery of the shoe opposite the tread surface, adjusting means are provided, these adjusting means consisting of screws 27 disposed one between each pair of spokes of the wheel (except that pair between which the stem 15 is disposed) and radially disposed and threadingly engaged with the felly 16. Adjustment of the screws serves to effect pressure radially on the inner shroud plate 22, effecting a pressure uniformly around the filler on the inner circumference, this pressure being transmitted through the filler to the outer shroud plate and from the latter to the tread surface of the shoe. The adjustment of the screws 27 having once been affected, it is maintained by means of lock nuts 28 engaged with the screws and bearing on the inner periphery of the felly.

The invention having been described, what is claimed as new and useful is:

1. In combination with a vehicle wheel and attached tire shoe, a filler consisting of a spiral spring, an anchor plate connected with the spring at one extremity and provided with a stem engaging the wheel, and a plate connected with the other extremity of the spring and having a seat in the anchor plate.

2. In combination with a vehicle wheel and attached tire shoe, a filler consisting of a spiral spring, an anchor plate connected with the spring at one extremity and provided with a stem engaging the wheel, and a plate connected to the other extremity of the spring, the anchor plate being bound for a portion of its circumference with a flange disposed opposite the tread surface of the tire and serving with the adjacent face of the anchor plate as a seat for the other plate.

3. In combination with a vehicle wheel and attached shoe, a filler consisting of a spiral spring of which its extremities are interlocked, the spring being disposed within the shoe and anchored to the wheel to prevent creeping with reference to the latter and the shoe, and shroud plates bounding the filler opposite the tread surface of the shoe and at the felly of the wheel, said tread shroud plate being circumferentially extensible, and an adjusting means carried by the wheel for effecting a radial pressure outwardly on the filler.

4. In combination with a vehicle wheel and attached shoe, a filler consisting of a spiral spring of which its extremities are interlocked, the spring being disposed within the shoe and anchored to the wheel to prevent creeping with reference to the latter and the shoe, and shroud plates bounding the filler opposite the tread surface of the shoe and at the felly of the wheel, said tread shroud plate being circumferentially extensible, and an adjusting means carried by the wheel for effecting a radial pressure outwardly on the filler, the inner shroud plate having interlocking engagement with the wheel.

5. In combination with a vehicle wheel and attached shoe, a filler consisting of a spiral spring of which its extremities are interlocked, the spring being disposed within the shoe and anchored to the wheel to prevent creeping with reference to the latter and the shoe, and shroud plates bounding the filler opposite the tread surface of the shoe and at the felly of the wheel, said tread shroud plate being circumferentially extensible, and an adjusting means carried by the wheel for effecting a radial pressure outwardly on the filler, both of said shroud plates consisting of a plurality of sections, those of the inner shroud plate being interlocked with the wheel and those of the outer shroud plate being interlocked with each other by series of tongue and slot connections.

In testimony whereof he affixes his signature.

GEORGE F. A. OCHS.